Nov. 27, 1956  R. C. RAGAN  2,771,839
APPARATUS FOR DEPOSITING ABRASIVE PARTICLES ON ARTICLES
Filed June 24, 1953  3 Sheets-Sheet 1
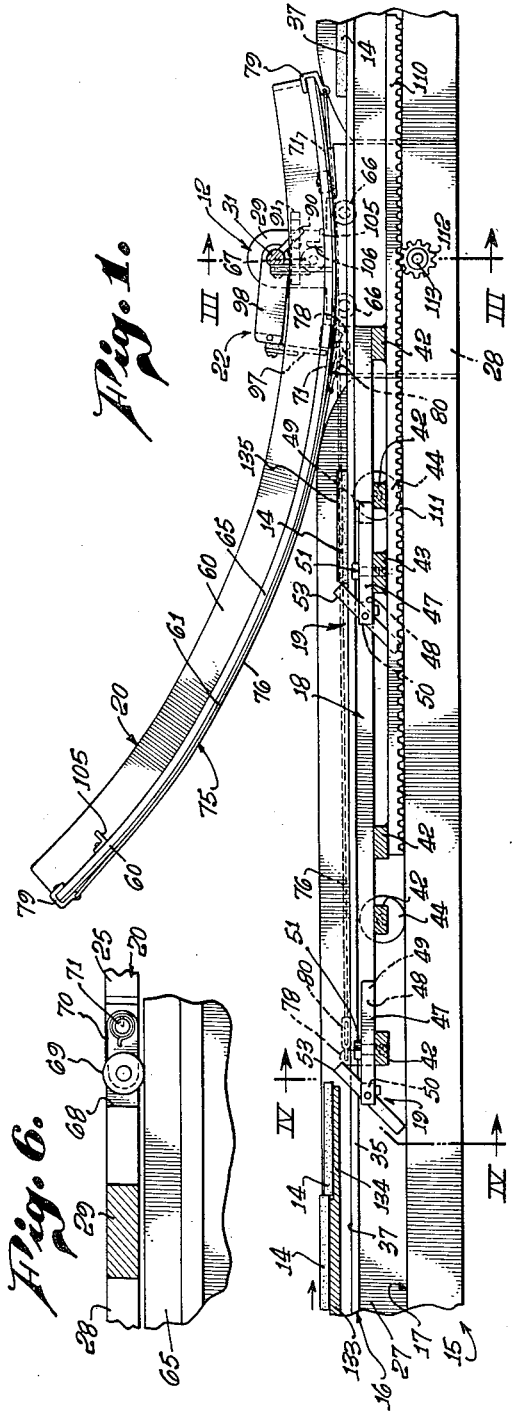
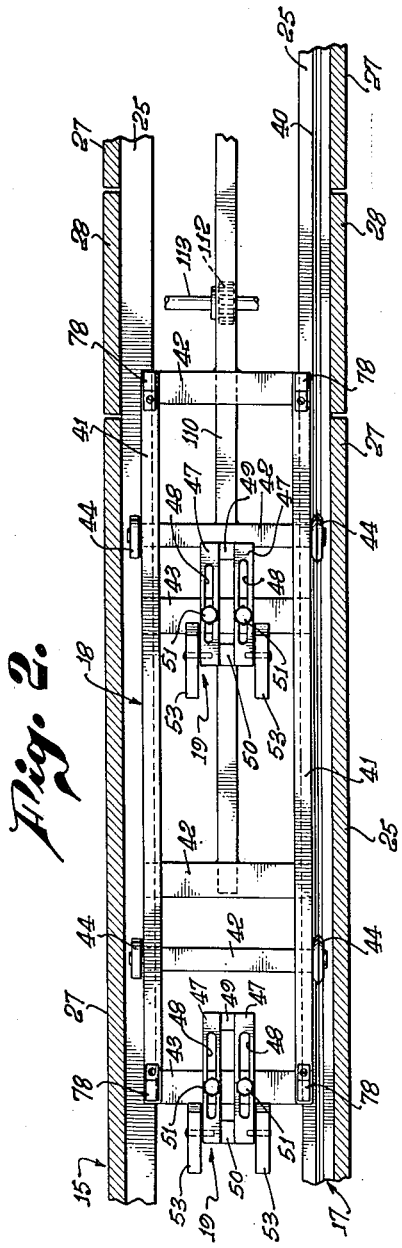
INVENTOR.
*Randall C. Ragan*,
BY
*Attorney.*

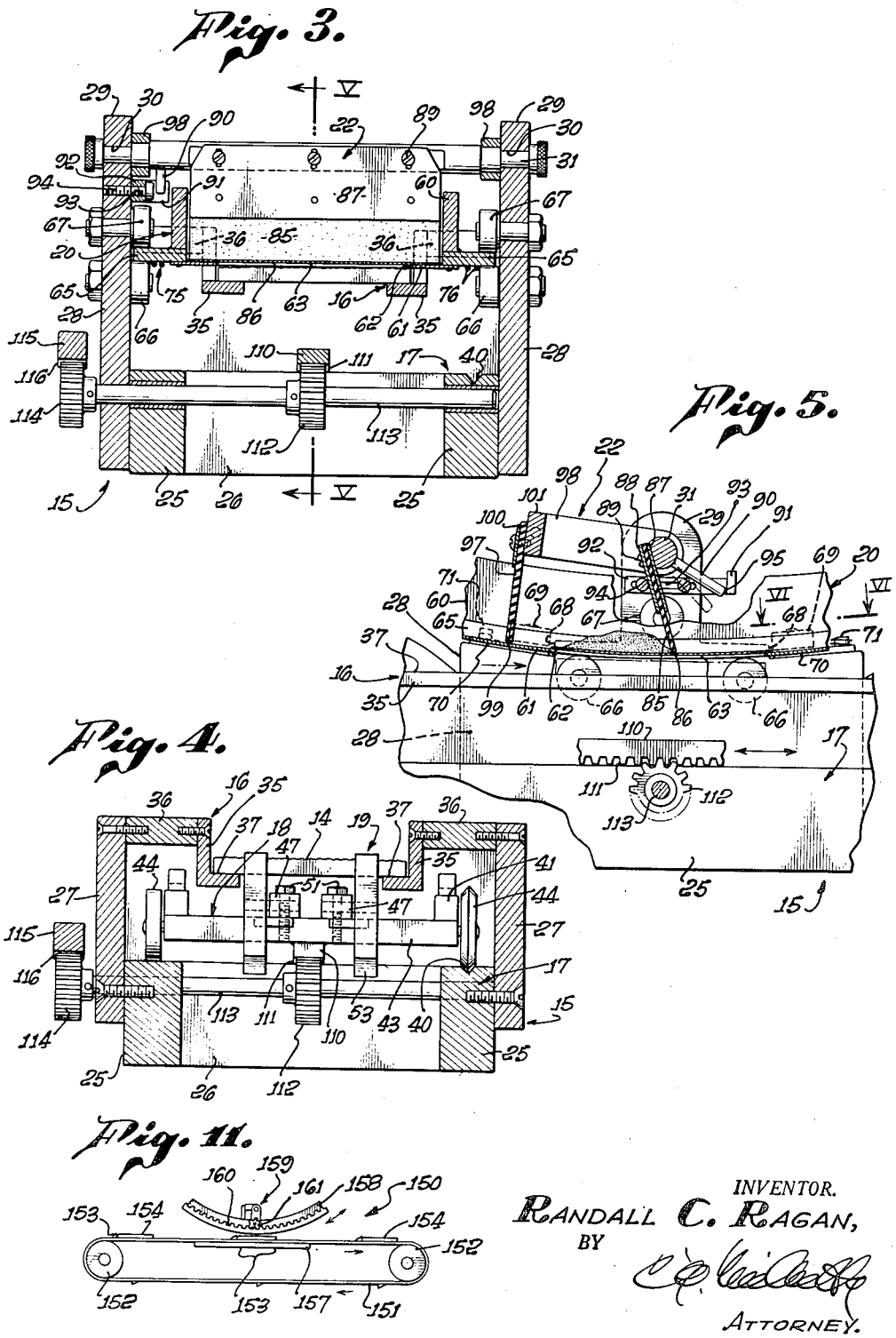

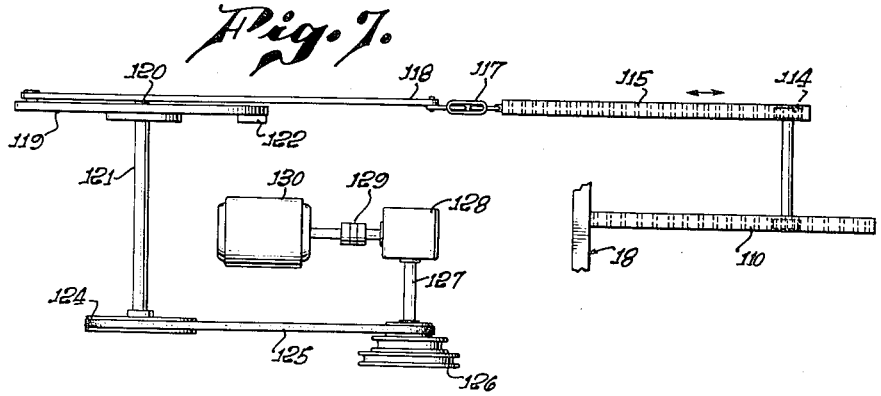
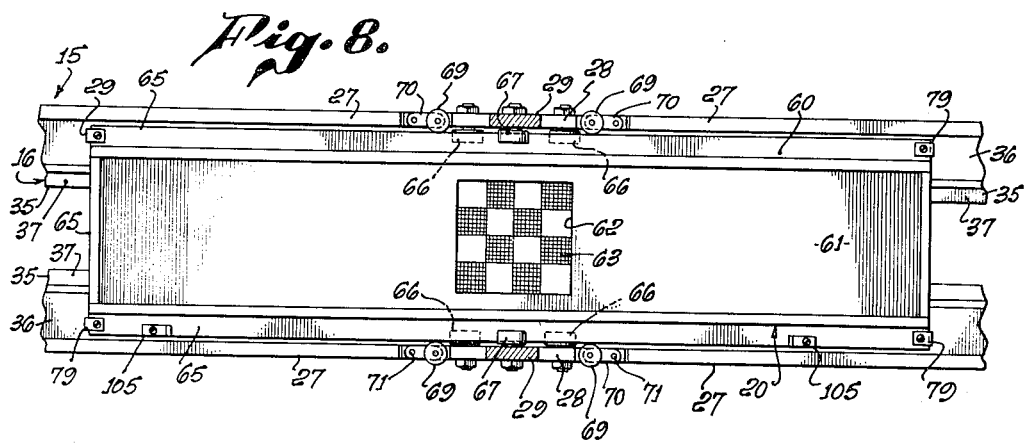
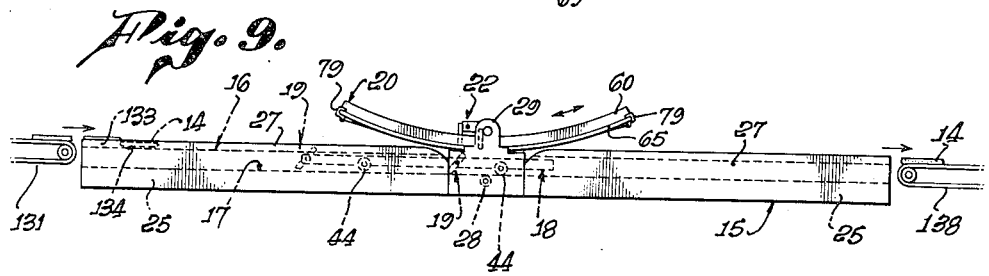
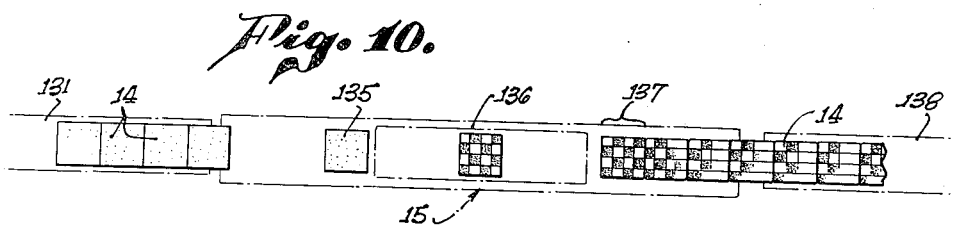

United States Patent Office 2,771,839
Patented Nov. 27, 1956

2,771,839

APPARATUS FOR DEPOSITING ABRASIVE PARTICLES ON ARTICLES

Randall C. Ragan, Glendale, Calif., assignor to Gladding, McBean & Company, Los Angeles, Calif., a corporation of California Application June 24, 1953, Serial No. 363,833

11 Claims. (Cl. 101—126)

This invention relates to means and methods for depositing abrasive resisting particles or a pigmented vehicle on selected surface areas of an object, tile, fabric, or the like. More particularly, the invention relates to an apparatus and a method of depositing in a pattern a viscous substance containing selected pigments and abrasion-resisting particles upon selected surface areas of a tile to provide an abrasion-resisting, non-slip surface. Tile provided with such abrasion resisting surfaces are especially suitable for kitchens, bathrooms, and showers where the tile must be glazed so as not to absorb water, and yet must be provided with a non-slip surface.

Prior attempts have been made to provide a non-slip tile surface with a glaze composition containing hard particles of an abrasion resisting material such as Alundum or Carborundum. Such glaze compositions were usually applied to the surface of the tile by spraying, the hard particles being deposited on the surface of the tile in the glaze composition. When the glaze composition containing hard particles was burned to maturity, the particles became coated with the glaze composition and often sank into the body of the glaze composition. Thus their non-slip and abrasion-resisting characteristics were substantially lost. In other words, the abrasion-resisting particles did not remain at the surface where needed, but instead were either covered with the glaze composition or embedded therewithin where they could not perform their desired function. In such a prior method, the abrasive particles in the glaze composition damaged spray nozzles used very quickly, caused rapid wear thereof, and it was impossible to produce glaze coatings of uniformly constant thickness and decorative effects were not obtained. When wear-resisting or abrasive particles were dusted upon a surface of a tile provided with a burned or unburned glaze composition, the same disadvantages and limitations obtain. In prior methods it was not possible to deposit a single layer of abrasive grain upon a desired surface in accordance with a predetermined pattern.

This invention contemplates a means and method for depositing abrasion-resisting particles upon the surface of a tile, or upon the surface of a tile covered with a glaze composition in such a manner that the particles will remain at the surface thereof and be capable of producing an effective abrasion-resistant, non-slip tile surface. The invention contemplates deposit of such particles in selected patterns so that the surface of the tile may include areas containing abrasion-resistant, non-slip characteristics and areas devoid of such particles. This particular arrangement is advantageous in the production of such tile because gases caused by chemical combining of the ingredients of the glaze composition during burning are allowed to escape without disturbing the deposited particles.

Generally speaking, the process contemplated by this invention comprises moving articles, each having a surface to which a decorative or wear-resisting material is to be applied, along a linear line of travel and in spaced relation through a depositing zone, and in oscillating a curved depositing surface, having a predetermined pattern, along an arcuate path tangent to the surface of the articles in the depositing zone. The motion of the curved surface and article is synchronized in one common direction of travel so as to cause the curved surface to deposit material (in accordance with a predetermined pattern) upon the surface of the article: The curved surface is moved in reverse direction when an article is not at the depositing zone, and the cycle repeated with the next article moving along the line of travel. The apparatus of the present invention may assume several forms and includes a frame structure provided with guide means for defining a straight horizontal path for said articles. Above the article path is an oscillatable, material holding curved box which is guided by the frame structure in a curved path tangential to the horizontal path. The curved box includes a bottom opening having a curved screen extending thereacross and presenting a curved depositing surface. Squeegee means extend into the box for pressing a decorative and wear-resisting material through the screen and upon the surface of an article moved into registration with the curved depositing surface. Means for moving the article includes a shuttle carriage means which is reciprocally driven along a path below the article path and which is interconnected with the curved box for oscillating the box in timed correlated movement therewith.

The primary object of this invention is to disclose and provide a means for substantially continuous production of a selected pattern on surfaces of objects or articles intermittently advanced through a deposit zone.

Another object of this invention is to disclose and provide a means for producing an abrasion-resistant surface on a tile wherein a screen is used for deposit of abrasion-resistant particles in a pattern upon the surface of the tile.

Another object of this invention is to disclose and provide an apparatus for producing a tile as above described wherein objects or tile to be processed are advanced in an intermittent progressive manner through a deposit zone where abrasive particles are deposited in a selected pattern on the tile.

A further object of this invention is to disclose and provide an apparatus for depositing abrasive particles on a tile as above described wherein means are provided for accurately guiding the tile along a selected path of travel and in a selected planar zone.

A still further object of this invention is to disclose and provide an apparatus as above described wherein a material-holding receptacle means carries a supply of abrasion-resistant particles in a suitable vehicle and is guided in a different path of travel from that of the tile. The invention contemplates providing the receptacle means with a screened opening in the bottom wall thereof which accurately registers with surface areas of a tile as the tile is moved along its separate path.

Other objects and advantages of the invention will be readily apparent from the following description of the drawings in which an exemplary apparatus embodying this invention is shown.

In the drawings:

Fig. 1 is a fragmentary side view partly in section showing an apparatus embodying this invention.

Fig. 2 is a fragmentary top view of shuttle carriage means shown in Fig. 1.

Fig. 3 is a transverse sectional view taken in the plane indicated by line III—III of Fig. 1.

Fig. 4 is a transverse sectional view taken in the vertical planes indicated by line IV—IV of Fig. 1.

Fig. 5 is a sectional view taken in a longitudinal vertical plane indicated by line V—V of Fig. 3.

Fig. 6 is a fragmentary top view taken from the plane indicated by line VI—VI of Fig. 5.

Fig. 7 is a schematic fragmentary plan view of a drive means for the apparatus shown in Fig. 1.

Fig. 8 is a top plan view of the material-holding receptacle means shown in Fig. 1.

Fig. 9 is a diagrammatic side view of an apparatus embodying this invention associated with tile feed means and tile discharge conveyor means.

Fig. 10 is a diagrammatic plan view of the apparatus shown in Fig. 9 and illustrating the movement and path of tile.

Fig. 11 is a diagrammatic view of a different apparatus embodying this invention.

The exemplary apparatus embodying this invention shown in the drawings comprises generally an elongated frame structure 15 (Fig. 9) provided with a laterally adjustable horizontal way means 16 which is adapted to slidably support a plurality of tile 14 advanced on the way means in a selected path. Below and parallel to way means 16 is a track means 17 for guiding and supporting shuttle carriage means 18 thereon. The carriage means 18 may include longitudinally spaced adjustable pairs of pawl means 19 adapted to normally extend into the horizontal zone of the tile for releasably engaging individual tile supported on the way means. At the central portion of the frame structure an upwardly curved, material-holding receptacle or trough means 20 is guidably supported on the frame structure and is interconnected with the carriage means 18 for correlated reciprocal movement therewith. The receptacle means 20 has a curved bottom wall provided with a screened opening which is adapted to accurately register with a tile advanced on the way means 16. A squeegee blade means 22 is pivotally supported from the frame structure above the receptacle means and extends within the receptacle means for pressing an abrasive containing vehicle through the screen and upon the surface of a tile registered in its movement with said screen.

The frame structure 15 includes vertical support legs (not shown) interbraced for rigidity and carrying a pair of parallel longitudinally extending side frame members 25. Transverse frame members 26 connect the side frame members 25 for rigidity. Against the outboard face of each side frame member 25 may be secured a pair of longitudinally spaced, upstanding elongated side plates 27.

Between the spaced side plates 27 a central side plate 28 may be secured in any suitable manner to the side frame members 25, the central plate 28 and the side plates 27 lying generally in the same plane. Each plate 28 includes an upstanding standard 29 projecting above the top edges of the side plates 27. The standards 29 are provided with transversely aligned ports 30 which receive end portions of a transversely extending shaft 31.

The way means 16 may comprise a pair of parallel, longitudinally extending L section members 35 which may be supported from the side plates 27 by means of a plurality of longitudinally spaced, removable filler blocks 36. Blocks 36 may be secured to the side plates 27 in any suitable manner as by stud bolt assemblies. Blocks 36 may be of any selected width so as to selectively space the L section members 35 to accommodate tile of different width. The L section members 35 may be secured to the blocks 36 as by screw bolts. The horizontal legs of opposed L section members 35 are inwardly directed toward each other and lie in the same horizontal plane and thereby provide longitudinally extending parallel top surfaces 37 upon which a tile may be slidably advanced in a horizontal planar zone and along a straight selected path of travel.

The track means 17 spaced below and parallel to the way means 16 is provided by the longitudinally extending top edge faces of the side frame members 25. Along one side the top face of a side member 25 may be provided with a longitudinally extending V or U shaped groove 40 for cooperable guiding engagement with wheels 44 on the corresponding side of the carriage means. The other side member 25 need not be grooved and may afford a flat top face upon which wheels 44 of the corresponding other side of the carriage may roll. It is understood that a guide groove may be formed on the latter member 25 if desired.

The shuttle carriage means 18 (Figs. 1 and 2) may comprise a pair of laterally spaced, longitudinally extending parallel side rails 41 which may be transversely interconnected intermediate their ends by a plurality of spaced, transverse cross members 42 and 43. The side rails 41 may include journal means for anti-frictionally supporting longitudinally spaced wheels 44 and axles therefor.

The pair of longitudinally adjustable pawl means 19 may be carried by the cross members 43. Each pawl means 19 may include a pair of transversely spaced elongated parallel bars 47 each provided with an elongated slot 48 therein. The pair of bars may be interconnected by a front end bar 49 and by a rear end bar 50. The pair of bars 47 may be longitudinally adjustably secured to the associated cross member 43 by a pair of stud bolts 51 which extend through slots 48 and into threaded bores provided in the cross member 43.

Each pawl means 19 includes a pawl or dog 53 pivotally mounted in bars 47 opposite the rear end bar 50. The top end portion of each dog 53 extends into the planar zone of tile 14 when supported on the way means 16 for releasably engaging a tile. Each dog 53 is normally positioned at an angle to the vertical by providing a greater quantity of metal below the pivotal connection of the dog than above the pivotal connection. Thus, the dog is normally gravitationally held in inclined tile-engaging position, but may also be easily pivoted into substantially horizontal position when the carriage moves rearwardly beneath tile supported on the way means.

The material-holding means 20 (Figs. 1 and 8) may comprise an upwardly curved rectangular frame 60 having upstanding side walls and end walls. A curved bottom wall 61 of thin sheet metal may be secured to the bottom edges of frame 60. The bottom wall 61 may be provided with a centrally located rectangular opening 62 of selected size, said opening 62 having a screen 63 extending thereacross. The screen 63 may be made of any suitable material such as a wire mesh, the mesh being of predetermined, selected size so as to permit passage therethrough of abrasion-resistant particles of desired size. Preferably, screen 63 includes closed and open mesh portions which define a selected pattern. An exemplary pattern illustrated resembles a checkerboard wherein closed and open mesh portions of rectangular configuration are alternately arranged. The screen 63 is secured across opening 62 in such a manner that its bottom surface virtually corresponds to the curvature of the bottom face of the bottom wall 61 so that transverse lines on the bottom face of the screen may meet the horizontal plane of the top surface of a tile in virtually tangential relation.

The receptacle means 20 may be reciprocally moved in a curved path between the central plates 28 and may be supported for such movement by guide means which include outwardly directed peripheral flanges 65 connected to the side and end walls of the frame 60 and corresponding generally to a peripheral extension of the bottom wall 61. The central side plates 28 carry a plurality of freely rotatable rollers which cooperably and guidably contact the flanges 65. A pair of longitudinally spaced rollers 66 are mounted for rotation about a horizontal axis at opposite ends of each plate 28 and are adapted to contact the bottom curved face of the associated flange 65 to support the receptacle means against downward displacement. A single roller 67 may be carried by each central plate 28 above and between the rollers 67 so as to engage the top curved surface of the flange 65 and to restrain the receptacle means against upward displacement. A pair of rollers 69 are carried by each central plate 28 at opposite ends thereof for engagement with the curved outwardly facing edge face of flange 65 so as to limit lateral displacement of the receptacle. Each roller 69 may be mounted for rotation about an upwardly and centrally inclined axis and may be supported within a notch 68 formed in top end corners of plate 28. Preferably, each roller 69 is mounted for rotation at one end of a short arm 70 pivoted at its other end as at 71 to the plate 28. The arms 70 may be biased inwardly by any suitable spring means. It will thus be apparent that the receptacle means is mounted for movement in a curved path above the path of tile 14 and is accurately laterally and vertically guided.

Means for correlating reciprocal movement of the carriage means and the swinging movement imparted to the receptacle means may include a cable means 75 interconnecting the rectangular frame 60 and the carriage means at each side thereof. Each cable means 75 may include a pair of flexible wire cables 76 extending beneath and between a flange 65 and the corresponding side member of the carriage. The cables 76 are crossed intermediate their ends so that at each end of the carriage and frame 60 adjacent ends of cables 76 are connected respectively to suitable securing lugs 78 and 79 provided respectively on the carriage and the flange 65. Each cable 76 may include a turnbuckle 80 for adjusting the length and tension thereof. The cable means 75 thus provides a simple effective means for correlating forward movement of the carriage means with forward swinging movement of the receptacle means. The cable means 75 also provides a convenient means for adjusting the relative longitudinal positions of the carriage and the receptacle means so that the opening in the bottom wall of the receptacle means will accurately register in longitudinal relation with a tile advance along the way means by the carriage means.

It should be remembered that an additional adjustment for providing accurate registration of the screen opening with a tile is provided by the pawl means carried by the carriage which are longitudinally adjustable with respect to the carriage so that a tile may be properly advanced along the way means for registration with the opening.

The abrasion-resistant particles desired to be deposited upon a tile surface may be carried by the receptacle means 20 between the walls thereof and are preferably contained within a relatively viscous, sticky vehicle which may be readily pressed through the screen 63 in a selected pattern and without diffusion or running of the deposited vehicle over the surface of the tile. A sharply defined pattern is thus deposited on the surface of the tile. It is understood that the apparatus is not limited to use with an abrasion-resistant, particle-containing vehicle, but may be also used with various other materials and with various other pigmented vehicles which are desired to be deposited upon the surfaces of objects other than the surface of a tile.

The means for pressing the particle-containing vehicle through the patterned screened opening in the receptacle means may include a squeegee means 22. The squeegee means 22 includes a shaft 31 pivotally mounted from the standards 29. On shaft 31 a leading squeegee or pressure blade 85 may be mounted in any suitable manner so as to extend into the receptacle means and virtually entirely between the side walls of the frame. The lower edge 86 of the squeegee blade 85 bears against the top surface of the bottom wall 61. In the example shown, the blade 85 may be clamped along its upper margin by two transversely extending metal bars 87 and 88, bar 88 being secured by suitable stud bolt assemblies 89 to shaft 31. The pressure blade 85 is limited in its pivotal movement about the axis of shaft 31 by a depending finger 90 provided adjacent one end of shaft 31. The finger 90 is adapted to abut against a transversely inwardly extending horizontal stop element 91 adjustably mounted on the adjacent standard 29. Element 91 includes a longitudinally extending portion 92 having a slot 93 therein which cooperably receives a pair of securing bolts 94 which threadedly engage bores provided in the standard 29. Blade 85 is adapted to pivot forwardly during forward movement of the receptacle means because of its contact with the bottom surface of the trough until stop element 91 and the finger 90 contact as at 95.

Means for maintaining and providing a suitable quantity of vehicle adjacent to the leading pressure blade 85 for pressing through the screen 63 may be provided by a second trailing squeegee blade 97 spaced rearwardly of blade 85 a suitably selected distance. The trailing blade 97 may be pivotally mounted for movement about a transverse axis in end portions of a pair of rearwardly directed arms 98 secured to standards 29. The trailing blade 97 has a bottom edge 99 normally in contact with the top surface of the bottom wall and extends virtually entirely between the side walls of the receptacle means. The blade 97 may be carried between a pair of transversely extending straps 100 and 101 which are clamped along its top margin. The strap 100 may carry end pins for pivotally mounting the blade 97 in the arms 98. This particular arrangement of the leading blade 85 and the trailing blade 97 serves to maintain the greater proportion of vehicle carried by the receptacle means between the blades so that it may be effectively spread over and pressed through the screen 63 when the receptacle means is moved forwardly.

Means for positively limiting reciprocal movement of the receptacle means may be provided by a pair of front and rear stop lugs 105 removably and adjustably carried on each flange 65 of the receptacle means, each stop 105 being adapted to abut the central roller 67 as at 106.

Drive means for reciprocally moving the carriage means along the track means 17 may include a longitudinally extending rack bar 110 carried by cross members 42 beneath the carriage. The rack bar 110 has a plurality of downwardly facing teeth 111 which mesh with a pinion 112 carried by a transverse rotatable shaft 113 journaled in frame members 25. One end of shaft 113 may extend outwardly of a frame member 25 and carries a pinion 114 having meshed engagement with a longitudinally extending rack 115 having downwardly facing teeth 116. Rack 115 may be pivotally connected at one end to an adjustable turnbuckle means 117 which may be pivotally connected to one end of a link 118, the opposite end of said link being pivotally connected to one end of a crank arm 119. The crank arm 119 is mounted for rotation intermediate its ends as at 120 about the axis of a transverse shaft 121 journaled in the frame structure 15 in any suitable manner. The opposite end of crank 119 may carry a counterweight 122. At the opposite end of shaft 121 may be mounted a pulley 124 connected by a pulley belt 125 to a variable drive pulley 126. The drive pulley 126 is carried on a transverse shaft 127 which is driven from a suitable hydraulic variable drive means diagrammatically indicated at 128. The drive means 128 may be connected by a suitable coupling 129 to an electrical motor 130 carried beneath the frame structure. It is understood that the drive means described above is exemplary only and that other suitable drive means may be employed for reciprocating the carriage on the track means.

Means for feeding tile to the apparatus may include a suitable belt conveyor 131 Fig. 9 disposed in alignment with the axis of the apparatus. In the example shown, tile in abutting relation may be fed by the conveyor at a selected speed upon a shelf 133 Fig. 1. The shelf 133 includes a front step 134 adapted to support a tile 14 in a plane slightly below the plane of a tile supported by shelf 133. The plane of the step 134 lies above the plane of the way surfaces 37 and the bottom surface of the shelf 133 and the step 134 lies slightly above the top surface of a tile positioned on the way surfaces 37. Thus, as tile are advanced forwardly into the apparatus a tile 14 positioned on the step 134 will permit the rear pawl means 19 to engage the trailing edge of a preceding tile positioned on the way surfaces. Thus, the rear pawl means may pick up a tile 14 without contacting or interferring with the tile being fed to the way means. The tile on the step 134 retains abutment with the following tile on the shelf 133 so as to be advanced onto the way means.

The feed means is correlated in timed relation to the reciprocal movement of the carriage means. When a leading tile 14 is initially engaged by the rear pawl means 19 and the carriage means is advanced forwardly such leading tile is moved along the way means in a straight path to an intermediate position indicated at 135, such position being the limit of forward advancement of the rear pawl means 19. As the carriage is retracted rearwardly, the lead tile is left in this intermediate position at 135. When the carriage reaches its rearmost position, the front pawl means 19 has been moved slightly rearwardly of the position at 135 so that the dogs 53 thereof may engage the trailing edge of the lead tile. At the same time, the rear pawl means 19 engages the trailing edge of a succeeding tile which has been pushed onto the way means while the carriage forwardly advanced the lead tile.

As the carriage is advanced again, the lead tile is advanced from its intermediate position at 135 by the front pawl means 19. The front pawl means advances the lead tile through a deposit zone at 136 where the screened opening of the receptacle means accurately registers with the surface of the tile. The accurate registration of the screened opening with the surface of the tile is accomplished by the simultaneous forward advancement of the receptacle means 20 in its curved path by reason of its interconnection with the carriage means through the cable means. The lead tile is advanced beyond the deposit zone to a third position at 137 which represents the limit of the forward movement of the front pawl means 19.

As the carriage is moved rearwardly, the dogs pass beneath the tile positioned at intermediate position 135 and the initial position adjacent to the feed shelf 133 and at the end of said rearward movement the dogs again engage the trailing edges of the respective tile for advancing the tile forwardly for the distance of the carriage movement. The second tile is advanced through the deposit zone by the front pawl means and is moved into abutment with the lead tile and pushes the lead tile forwardly for the length of a tile. Thus, there is accumulated on the discharge side of the apparatus a plurality of printed tile having transverse edges in tight abutment.

As the tile is accumulated on the discharge side of the apparatus as shown in Fig. 10 they may be pushed outwardly off of the way means onto a suitable conveyor 138. The conveyor 138 may be of any suitable type and may include an apparatus wherein the tile are stacked in furniture as they are removed from the end of the way means.

It will be observed that the apparatus causes abrasive or wear-resisting particles or grain to be accurately and automatically deposited (in accordance with a predetermined pattern carried by the curved screen or depositing surface 63) upon the surface of tile. The body or supply of material in receptacle 20 is held in available position throughout the operation and is positively and uniformly deposited through the screen. By controlling the concentration of grain in the vehicle and the mesh of the screen 63 with respect to the particle size of the grain, the quantity of grain deposited can be readily controlled so that a single layer of spaced grain can be deposited in desired areas of the surface of a tile, if desired. The mesh or fineness of the screen used on the machine can be varied in accordance with the particle size of the wear-resistant grain used. For example, when grain passing 60 mesh and remaining on an 80 mesh sieve is used, the applying screen may be 40 or 50 mesh; when grain passes 150 and remains on 175 mesh, the screen may be 100 or 120 mesh. In this manner the grain is most effectively used and results in what may be termed a single grain layer, essentially all of the grains having one face exposed from the glaze and effectively resisting wear and imparting decorative and anti-slipping characteristics to the tile. When screen 63 is made of nickel or bronze wire, long life is assured, but even silk can be used. Designs or patterns carried by the depositing screen may be photographically prepared if desired.

It is to be remembered that the grain is deposited on the surface of the glaze composition previously applied to the tile, and such glaze composition may be either unburned or matured at the time of such deposition. At all events, the vehicle is burned off in a subsequent firing operation and the grain remains on the surface, being only partly embedded therein, thereby producing decorative areas (generally of a matte finish effect) which are extremely wear-resisting and impart anti-slip characteristics to the tile.

In Fig. 11 there is illustrated a different modification of an apparatus which embodies this invention. In Fig. 11 the apparatus generally indicated at 150 includes an endless belt conveyor 151 carried by spaced end rollers 152 which may be driven in well-known manner. The endless belt 151 carries a plurality of longitudinally spaced, transversely extending tile-engaging lugs 153. Each lug 153 is adapted to engage the trailing edge of a tile 154 fed to said conveyor 151 by any suitable feed conveyor means (not shown). As tile 154 are advanced through a deposit zone indicated at 155 the tile may be held against downward displacement by suitable rigid guide plates 157.

Oscillatable above the deposit zone at 155 is a material-holding receptacle or box 158 of arcuate form and of substantially the same construction as that described in the previous embodiment. The arcuate box 158 is adapted to carry an abrasive particle-containing vehicle and is provided with a screened opening having a curved depositing surface of a selected pattern. Squeegee means generally indicated at 159 may also be of similar construction to that shown in the previous embodiment and is arranged to press the abrasive particle-containing vehicle through the screened opening onto the surface of a tile as the tile passes through the depositing zone 155.

The arcuate box 158 may be oscillated in the manner described in the previous embodiment by means of a curved rack 160 carried on one side of the box. A pinion gear 161 engages the teeth of the rack and is driven through suitable drive means for oscillating the box 158. The drive means for the pinion gear 161 is correlated with the drive means for the endless belt 151 so that the box 158 is reciprocally moved in correlation with the advancement of the tile 154 and the depositing surface of the box is accurately registered with the top surface of the tile.

It will be noted that the operation of the apparatus shown in Fig. 11 embodies virtually the same method as that shown in the prior embodiment wherein the arcuate box and tile are advanced together in one direction, the tile moving in a linear path of travel while the curved depositing surface on the box moves in a curved path of travel tangential to said linear path. After a tile has passed through the depositing zone 155 the arcuate box 158 is moved rearwardly and the depositing surface passes through the deposit zone 155 in the space provided between adjacent tile so that there is no deposition of material upon a surface to be treated.

The apparatus of this invention described in the above embodiments includes means to adjust the apparatus to tile of different width and size; means to accurately adjust the registration of discrete tile or articles with respect to the depositing surface, said latter means including the longitudinal adjustment of the pawl means with respect to the shuttle carriage means, the adjustment of the cable means which interconnects the receptacle means 20 and the carriage means and the adjustments laterally of the guide means for the receptacle means.

It is understood that various modifications and changes may be made in the apparatus described above which embodies this invention and which come within the scope of this invention and all such changes and modifications which come within the scope of the appended claims are embraced thereby.

I claim:

1. In an apparatus for depositing in a selected pattern abrasive particles on the surface of a tile, the combination of: a frame structure comprising horizontal spaced parallel ways for supporting and guiding a tile and horizontal track means extending parallel to and below said ways; carriage means reciprocally movable on said track means and including upwardly extending pawl elements adapted to releasably engage a tile; a downwardly extending squeegee blade means pivotally carried by the frame structure above and adjacent a deposit zone; an open trough provided with a curved bottom wall having an opening and receiving the blade therewithin, said trough being adapted to carry a supply of abrasive particles; a screen extending across said opening and having a selected pattern; antifriction means carried by the frame structure for guiding and supporting said trough; cable means interconnecting said trough and said carriage for correlating movement of the trough and a tile advanced by the carriage whereby the opening is registered with the surface of an advancing tile in the deposit zone; and drive means for reciprocally moving the carriage along said track means whereby tile is intermittently and progressively advanced along said parallel ways and through the deposit zone.

2. In an apparatus as claimed in claim 1 wherein the squeegee blade means comprises a front and rear blade pivotally mounted on the frame structure, and means carried by the frame structure for limiting pivoted movement of the front blade.

3. In an apparatus as claimed in claim 1 wherein said cable means includes a pair of cables on each side of the trough, the adjacent ends of each pair of cables being connected respectively to the adjacent ends of the trough and of the carriage.

4. In an apparatus as claimed in claim 1 wherein the trough includes sidewardly extending curved flanges and wherein the antifriction means includes a plurality of rollers at each side of the trough in rolling contact with top, bottom and edge faces of the curved flanges.

5. In an apparatus as claimed in claim 1 wherein the drive means comprises a rack carried by the carriage and a pinion supported from the frame structure engaging the rack.

6. In an apparatus as claimed in claim 1 including means for feeding tile to one end of said parallel ways, said tile feeding means including tile guide and support members positioned above the said end of said ways for temporarily carrying a tile beyond reach of the pawl elements of the carriage.

7. In an apparatus for depositing a pigmented vehicle upon selected surface areas of an object advanced through a deposit zone, the combination of: a frame structure comprising a support and guide means for advancement of an object along a selected path of travel through the deposit zone; reciprocating shuttle means supported by the frame structure below the object path for progressively advancing the object; said shuttle means having elements adapted to releasably engage an object; receptacle means for holding a supply of pigmented vehicle, said receptacle means being supported and guided from the frame structure above said object path and provided with a curved bottom wall having an opening therein; a curved screen extending across said opening and arranged to virtually tangentially contact and register with the surface of the object passing through the deposit zone and upon which the pigmented vehicle is to be deposited; means carried by the frame structure at the deposit zone and extending into the receptacle means for pressing pigmented vehicle through the screen and upon the surface of the object.

8. In an apparatus as claimed in claim 7 wherein said shuttle means is provided with longitudinally spaced object engaging elements for advancing at least two objects along said path simultaneously.

9. In an apparatus as claimed in claim 8 wherein each of said elements are adjustably mounted on the shuttle means for adjusting the longitudinal spacing of objects advanced thereby.

10. In an apparatus as claimed in claim 7 wherein a plurality of roller assemblies are mounted on the frame structure adjacent the deposit zone for guiding said receptacle means and for limiting relative lateral and vertical movement of the receptacle with respect to an object advancing through the deposit zone.

11. In an apparatus for continuously intermittently advancing discrete articles through a zone for depositing an abrasive-containing vehicle upon a surface of each article the combination of: a frame structure; guide means on the frame structure defining a linear path for said articles; oscillatable receptacle means guided by the frame structure in a curved path above said linear path and in tangential relation thereto, said oscillatable means including a curved bottom wall having an opening and a curved screen means covering said opening; said oscillatable means being adapted to hold a supply of abrasive-containing vehicle; means carried by the frame extending into close proximity with the top surface of the bottom wall for pressing the abrasive-containing vehicle through said screen means; means carried by the frame structure interconnected with said oscillatable means and adapted to intermittently engage a discrete article for advancing said article and for moving said oscillatable means in correlated movement with said article for registration of said article and screen means at the deposit zone.

References Cited in the file of this patent

UNITED STATES PATENTS

| Re. 16,048 | Scott et al. | Apr. 21, 1925 |
| 18,618 | Wilcox | Nov. 10, 1857 |
| 513,212 | Stackhouse | Jan. 23, 1894 |
| 1,411,267 | Christopherson | Apr. 4, 1922 |
| 1,832,216 | Johnston et al. | Nov. 17, 1931 |
| 1,966,416 | Parmele et al. | July 10, 1934 |
| 2,009,098 | Smith et al. | July 23, 1935 |
| 2,116,467 | Secoy | May 3, 1938 |
| 2,183,223 | Mankin et al. | Dec. 12, 1939 |

OTHER REFERENCES

Screen Process Printing, by Albert Kosloff, published by the Signs of the Times Publishing Co., Cincinnati, Ohio, pages 10 and 11. (Copy in Division 17.)